United States Patent [19]
O'Malley et al.

[11] 3,736,623

[45] June 5, 1973

[54] MEAT TENDERIZER APPARATUS

[75] Inventors: James J. O'Malley; Murray C. Strickland, both of Granada Hills, Calif.

[73] Assignee: Hollymatic Corporation, Park Forest, Ill.

[22] Filed: July 16, 1971

[21] Appl. No.: 163,288

[52] U.S. Cl. ................................................17/25
[51] Int. Cl. ..............................................A22c 9/00
[58] Field of Search .............................17/25, 27, 28

[56] References Cited

UNITED STATES PATENTS

| | | | |
|---|---|---|---|
| 3,654,664 | 4/1972 | Fetzer et al. | 17/25 |
| 1,141,682 | 6/1915 | Bass | 17/25 UX |
| 2,223,467 | 12/1940 | Spang | 17/27 |
| 1,165,217 | 12/1915 | Wemple | 17/25 |
| 3,535,734 | 10/1970 | Ross | 17/25 |

FOREIGN PATENTS OR APPLICATIONS

| | | | |
|---|---|---|---|
| 341,488 | 1/1931 | Great Britain | 17/25 |

*Primary Examiner*—Lucie H. Laudenslager
*Attorney*—Azel A. Hofgren et al.

[57] ABSTRACT

Apparatus for tenderizing meat comprising a support for the meat, a plurality of elongated cutting elements each comprising a blade with a cutting edge end with the blades being in two sets of a plurality of blades each and with each set arranged at an acute angle to the support and to each other and being reciprocable at their acute angles into and from meat held by the support to sever fibers and other severable toughening portions of the meat. The disclosure also includes an apparatus for tenderizing meat comprising a plurality of cutting elements reciprocable into and out of meat held on a support and hold-down means for holding the meat on the support during the reciprocating and means operatively interconnecting the hold-down means and the blades on the reciprocating of the blades away from the meat for withdrawing the hold-down means together with means for releasing this interconnecting means on the reciprocating of the blades into the meat for unrestricted spring urging of the hold-down means into meat engagement. The disclosure also includes the blades and the means for reciprocating the blades into and out of the meat in combination with drive means for moving a support and meat thereon relative to the blade together with indexing means for indexing the drive means in successive increments of movement comprising a reciprocable ratchet connected to the drive means for indexing on movement of the reciprocable ratchet in one direction. The disclosure also includes an apparatus for tenderizing meat including a support for the meat, a drive means for moving the support and thus the meat comprising a longitudinally extensive member such as a link chain and securing means releasably connecting the support and the extensive member for moving the support along with the extensive member.

18 Claims, 10 Drawing Figures

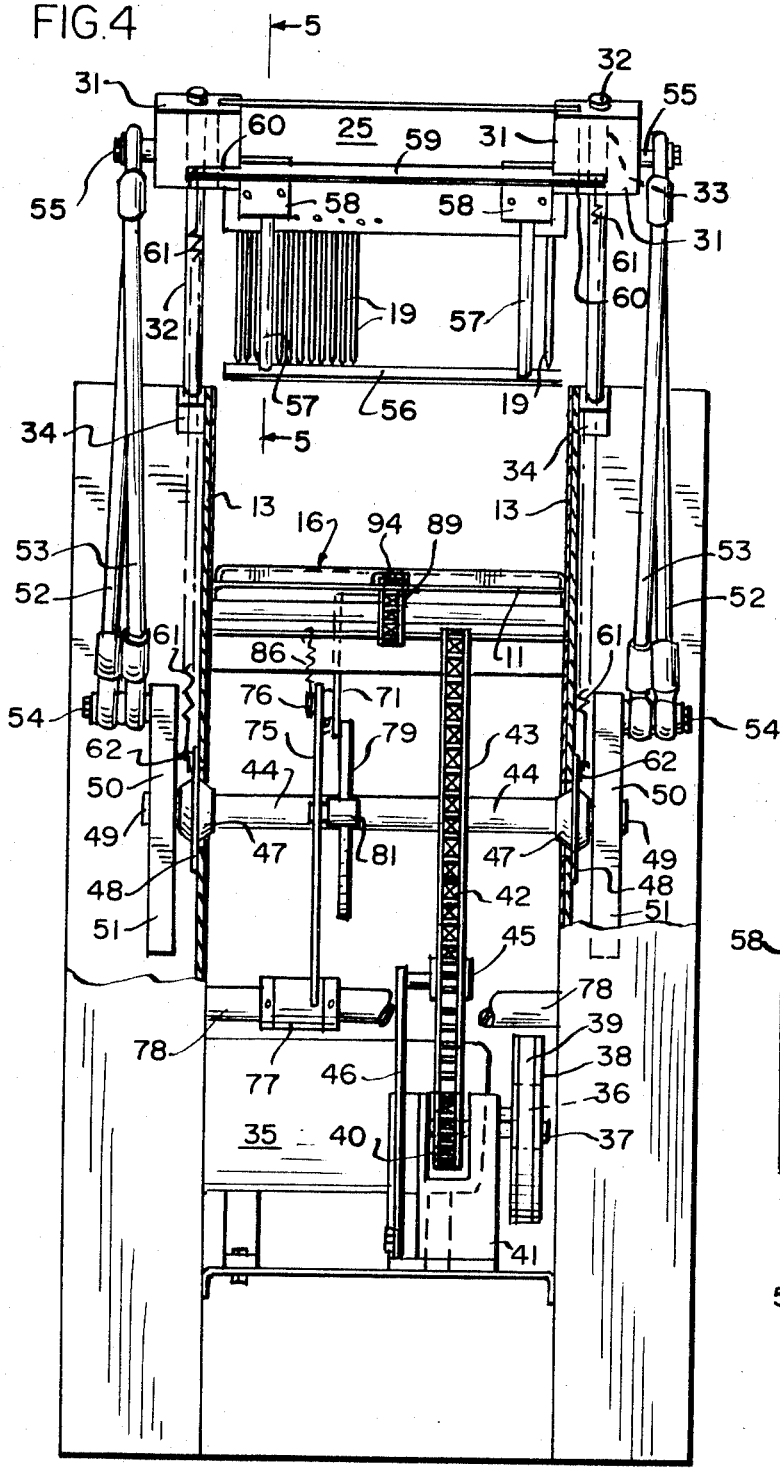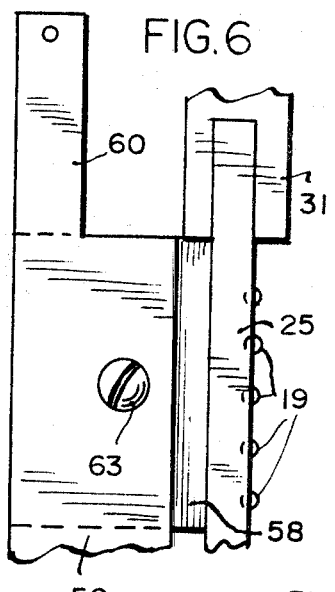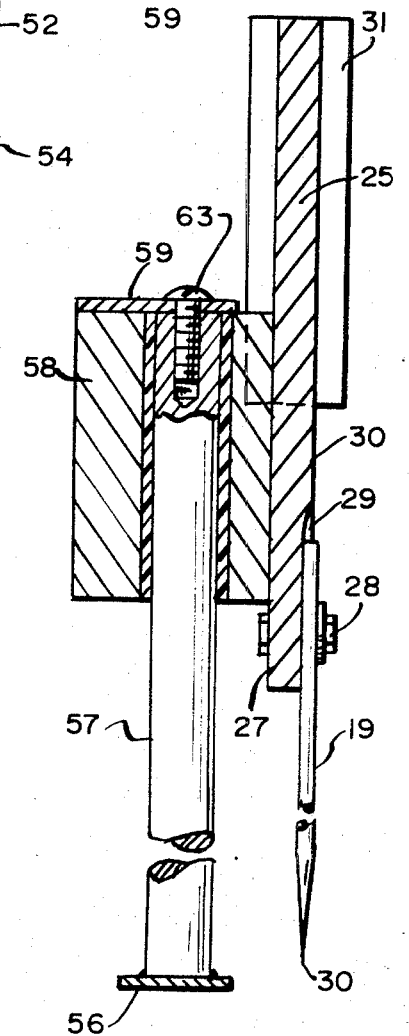

MEAT TENDERIZER APPARATUS

BACKGROUND OF THE INVENTION

The invention relates to an apparatus for tenderizing meat in which a plurality of elongated blades with knife ends are reciprocated into and out of meat held on a support with the support and thus the meat thereon being indexed in increments of movement relative to the knives intermediately periods of reciprocation.

Many forms of apparatus for tenderizing meat with thin knives for penetrating the meat and severing fibers therein have been proposed and there have been many patents issued on structures of this type. Prior Pat. U.S. Pat. No. 1,165,217 dated Dec. 21, 1915 discloses a structure comprising a single set of individually elongated blades with a conveyor and hold-down means in which the blades are in a set parallel to each other and at an acute angle to the path of travel of the meat. Another U.S. Pat. No. is 1,987,649 dated Jan. 8, 1935 which discloses a conveyor for conveying meat through a tenderizing station at which elongated tenderizing blades are arranged in two sets one above and one below the meat to be inserted into and withdrawn from the meat in the severing operation. U.S. Pat. No. 2,322,243 dated June 22, 1943 discloses a meat tenderizing machine comprising a plurality of closely adjacent blades arranged for penetrating the meat together with a stripper grid that is spring urged away from the knives so that when the knives or blades are withdrawn the spring urged stripper member prevents the meat adhering to and moving with the blades. U.S. Pat. No. 2,559,270 dated July 3, 1951 also discloses a meat tenderizing machine including a number of meat penetrating blades together with indexing means for moving the meat relative to the knives after they have been withdrawn from the meat. U.S. Pat. No. 3,334,377 of Aug. 8, 1967 also discloses a similar structure in which a support for the meat is indexed through an increment of movement after the reciprocable tenderizing blades have been withdrawn from the meat. U.S. Pat. No. 3,535,734 of Oct. 27, 1970 similarly discloses a meat tenderizing machine in which a plurality of adjacent elongated knives are reciprocated into and out of the meat, a hold-down grid is provided to prevent the meat adhering to and moving with the knives and an indexing apparatus for moving the meat relative to the knives after they have been withdrawn.

The present apparatus is thus generally concerned with the same problems as those of the above prior patents, namely tenderizing meat in a continuous manner while providing hold-down means and indexing means. However, the apparatus of this invention is simpler and more efficient in construction and operation, provides a more effective tenderizing of the meat and has other features set out in the following description and covered in the accompanying claims.

The most pertinent references of which applicants are aware are U.S. Pat. Nos. 2,223,467, 2,323,769, 2,527,038 and 3,654,664 and British Pat. 341,488. However, none of these have the advantages of construction and operation that the apparatus of this invention possesses.

BRIEF DESCRIPTION OF THE DRAWINGS

FIG. 4 is an end elevational view partially broken away for clarity of illustration and taken from the right end of FIG. 1.

FIG. 5 is an enlarged sectional view partially broken away and partially in section taken substantially along line 5—5 of FIG. 4.

FIG. 6 is a fragmentary plan view of the structure in FIG. 5.

DESCRIPTION OF THE PREFERRED EMBODIMENT

Figure 1:
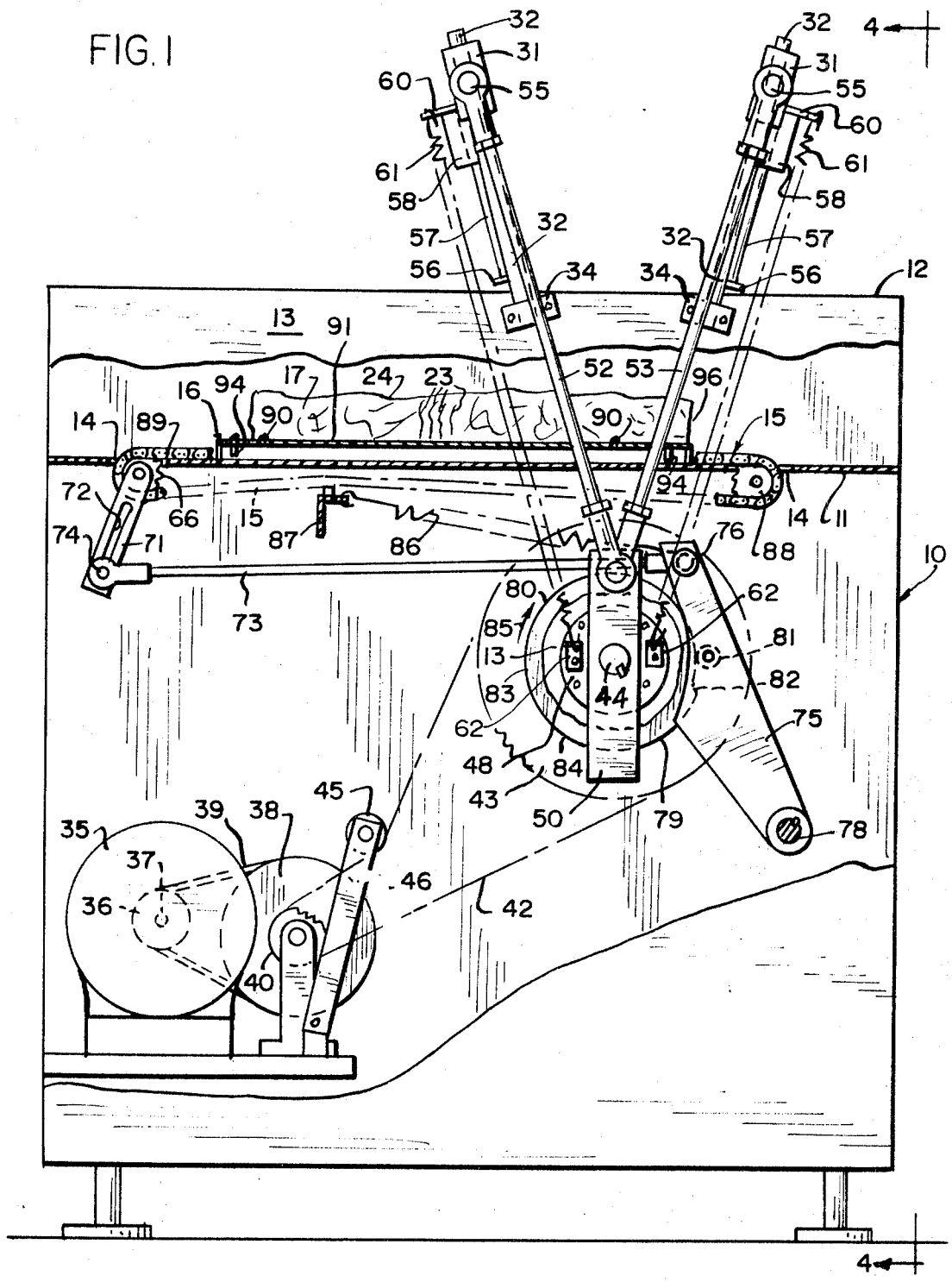
FIG. 1 is a side elevational view of one embodiment of the invention with portions broken away and in section for clarity of illustration.

In the embodiment illustrated in the drawings the meat tenderizing apparatus comprises a cabinet 10 having therein a horizontal partition 11 spaced below the top edges 12 of the sides 13 of the cabinet. Extending through the partition 11 at openings 14 therein is a drive means 15 in the form of an endless chain for moving a meat support platform 16 and a portion of meat 17 thereon. The drive means and the operating mechanism therefor and the platform 16 will be described in greater detail hereinafter.

Figure 8:
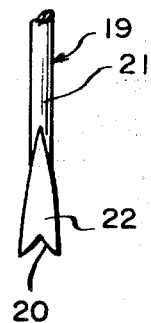
FIG. 8 is a fragmentary side elevational view of the cutting end of a blade.

In order to tenderize the meat 17 on the support 16 there are provided a plurality of elongated cutting elements 18 each comprising a thin blade 19 that is elongated and having a cutting edge end 20 as shown in detail in FIG. 8. As is shown there the blade 19 of this embodiment has a circular cross section body 21 and a tapered end 22 the bottom of which is the cutting edge which is of inverted V-shape in order to efficiently penetrate the meat and sever the fibers therein.

The blades 19 are retained in two sets of a plurality of substantially parallel blades each, with one set being shown in side elevation in FIG. 4. The blades in each set are in a common plane that is arranged at an acute angle to the support 16 and meat 17 held thereon with the blades in the two sets also being at a downwardly and inwardly inclined acute angle to each other. With this arrangement of the blades the up and down reciprocation of the sets of blades causes the angular blades to sever meat fibers indicated schematically at 23 and at the same time to squeeze or pinch the meat between the areas penetrated by the knives. Because of the angular arrangement of the blades the fibers 23 are severed efficiently and rapidly particularly because most of the fibers of portions 17 of meat extend generally vertically of the opposite flat sides 24 of the meat.

Figure 7:
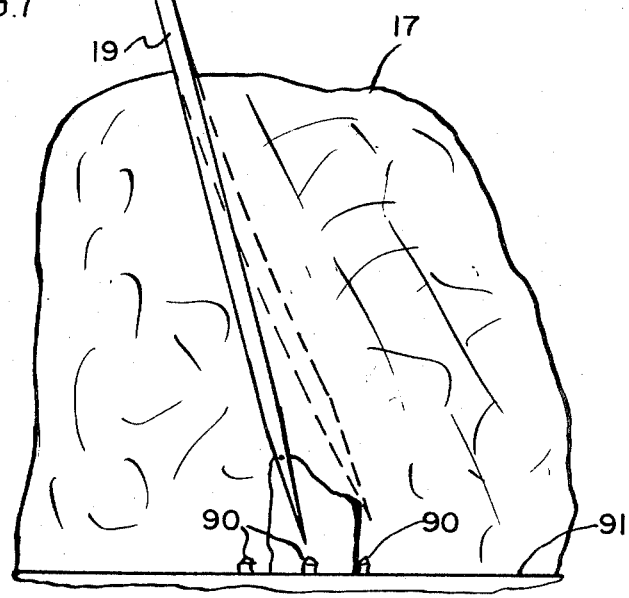
FIG. 7 is a fragmentary sectional view through the knife plate and showing an associated knife blade in side elevation both when inserted into meat in a tenderizing operation and when deflected sideways by a bone or impenetrable object.

The means for retaining the blades of each set in the above-described angular relationship includes a mounting means plate 25 that extends transversely to the support 16, the meat 17 thereon and the top partition 11. As is illustrated in detail in FIGS. 5 and 7 each blade 18 has the top end 26 of its slender cylindrical shank or body 21 bolted at an edge 27 of the plate by a series of bolts 28. The top end 26 of each blade 18 is held in a recess 29 in one side surface 30 of a plate 25 so that the axes of each set of blades 18 are substantially coplanar with each other and with the side surface 30.

As is illustrated most clearly in FIG. 4 each mounting means plate 25 is provided with a pair of spaced slide blocks 31 at each end of the plate and each block is provided with a guide means in the form of a pair of parallel rods 32 each engaging an opening 33 in a block 31 with the blocks, the mounting plate 25 and the sets of blades 19 attached thereto being guided in their up and down reciprocation by these rods 32 and thus the rods and blocks maintain the above-described angular relationship of the two sets of blades to each other and to the meat during the cyclical reciprocation of the two sets of blades.

Figure 2:
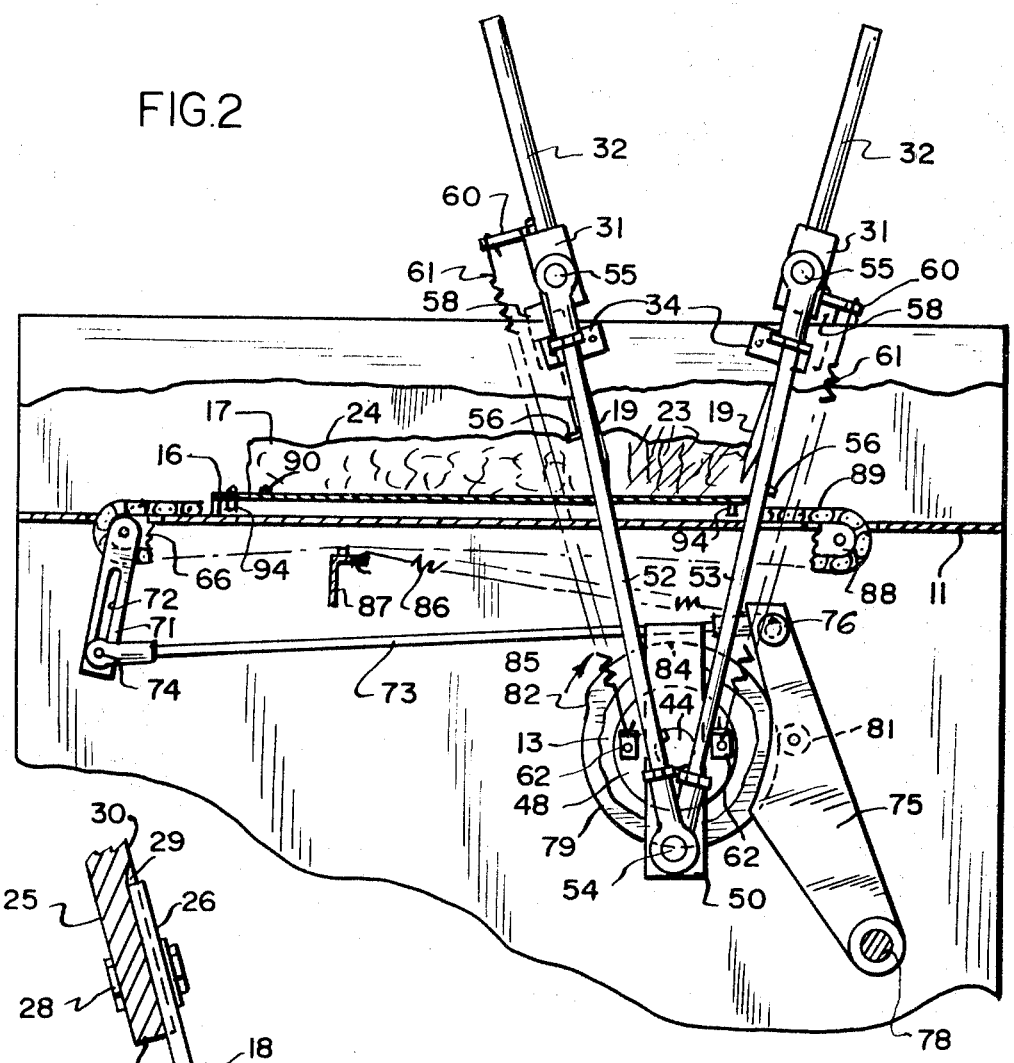
FIG. 2 is a view similar to FIG. 1 but showing only a portion of the machine and with operating parts in opposite positions from those shown in FIG. 1.
Figure 3:
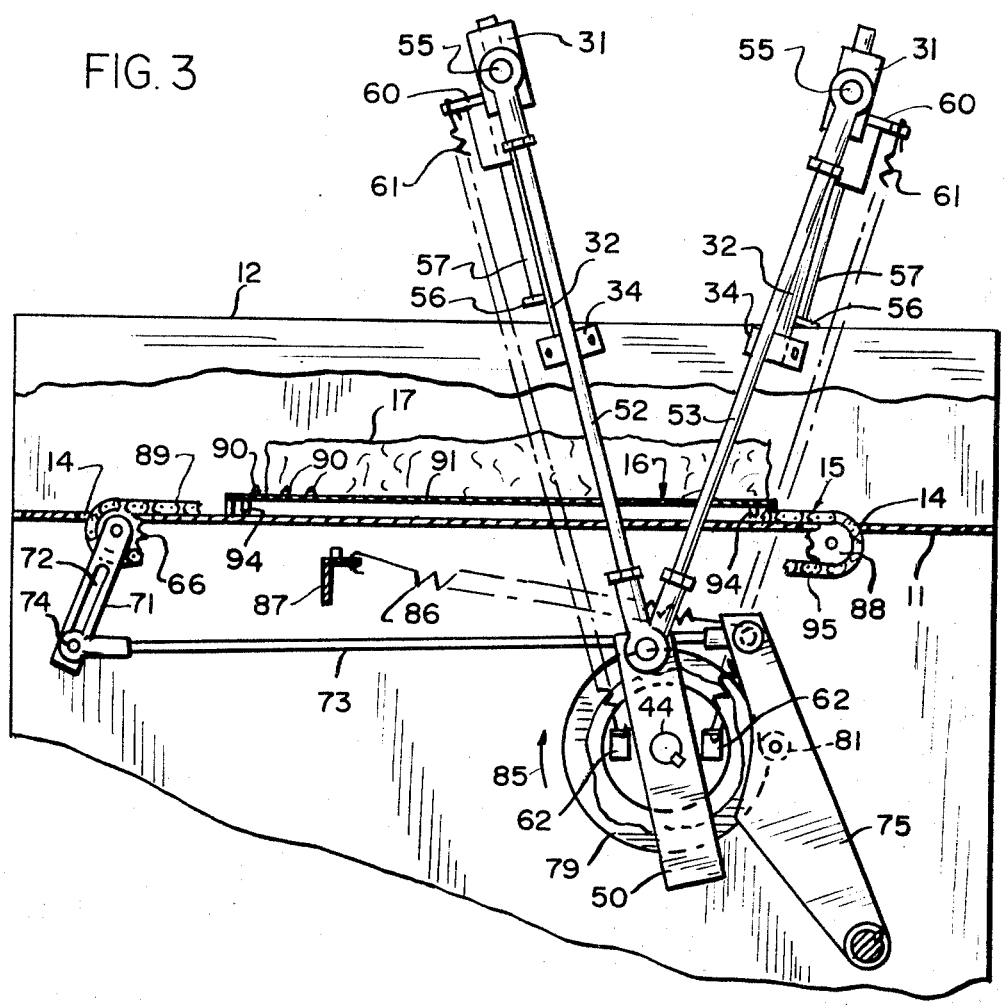
FIG. 3 is a view similar to FIG. 2 but showing the corresponding parts of the apparatus in advanced positions from those of FIG. 2.

The bottom ends of the rods 32 are attached to the sides 13 of the cabinet 10 by mounting brackets 34. In order to reciprocate the two sets of cutting element blades 19 at the above-described acute angles from above the meat as shown in FIG. 1, into the meat as shown in FIG. 2 and then back to an elevated position as shown in FIG. 3 there are provided drive means comprising an electric motor 35, a pulley 36 rotated by the motor shaft 37 and a larger pulley 38 with the pulley 38 being driven by a drive belt 39.

The pulley 38 has coaxially arranged therewith and driven thereby a chain drive sprocket 40 held in a mounting bracket 41. This sprocket 40 drives a chain 42 which is endless and passes around and drives a second larger sprocket 43 which is attached to and rotates the transverse drive shaft 44 that extends between the side walls 13 of the cabinet 10. In order to keep the chain 42 taut on the sprockets 40 and 43 there is provided a roller 45 on an arm 46 and engaged by the chain 42 to maintain pressure on the chain.

The drive shaft 44 is journalled in bearings 47 each of which is held in a bearing plate 48 in a side wall 13. As is shown most clearly in FIG. 4 the opposite ends of the drive shaft 44 extend outwardly beyond the bearings 47 and plates 48. Mounted on each end 49 of the drive shaft 44 is an arm 50 that functions as a crank arm with one end 51 operating as a counterweight. The opposite end of each essentially straight bar crank arm 50 has attached thereto a pair of drive rods 52 and 53 that are rotatably mounted on bearing pins 54 extending outwardly and parallel to the drive shaft 44.

The drive rods 52 and 53 extend generally upwardly and the top ends of each pair of drive rods 52 are drivingly attached to outwardly extending pins 55 on the one pair of slide blocks 31 while the other pair of drive rods 53 are similarly attached to similar pins 55 on the other pair of slide blocks 31. With this arrangement rotation of the drive shaft 44 by the motor, belt and chain structure previously described causes rotation of the crank arms 50 and up and down reciprocation of the pair of plates 25 and the angled sets of blades 19. The reciprocation is guided by the slide rods 32 and the blocks slidable thereon so that the angled converging relationship of the blades is maintained from the raised position as shown in FIG. 1 to the meat penetrating position of FIG. 2 and then back to the elevated position of FIG. 3 during which the drive shaft 44 and the crank arms 50 have been rotated through 360°.

An important feature of the invention is the portions of the apparatus serving as hold-down means for holding the meat on the support 16 during the above-described reciprocation of the blades 19 into and out of the meat. This hold-down means as illustrated in the embodiment comprises a transverse stripper bar 56 which when in elevated position and out of contact with the meat surface 24 is slightly below the cutting edge ends 20 of the blades 19 as illustrated most clearly in enlarged detail in FIG. 5.

The opposite ends of each stripper bar 56 are attached to guide members in the form of parallel rods 57 whose upper ends are slidable within bearing members 58 mounted on each transverse plate 25. The upper ends of these guide rods 57 are attached to a transverse bar 59 whose ends 60 extend beyond the bearings 58 and plates 25 as illustrated in FIG. 4.

In order to constantly urge the pair of stripper bars 56 in their lowermost positions as illustrated in FIG. 5 these opposite ends 60 are each attached to a tension spring 61 each of which has its lower end attached to a mounting bracket 62 on the outer surfaces of the bearing plates 48. With this arrangement the springs 61 constantly urge the transverse bars 59 against the top surfaces of the bearing members or blocks 58 which as previously described are attached to the mounting plates 25. As is shown in enlarged detail in FIG. 5 the bars 59 are firmly secured to the guide rods 57 by attaching screws 63.

Figure 10:
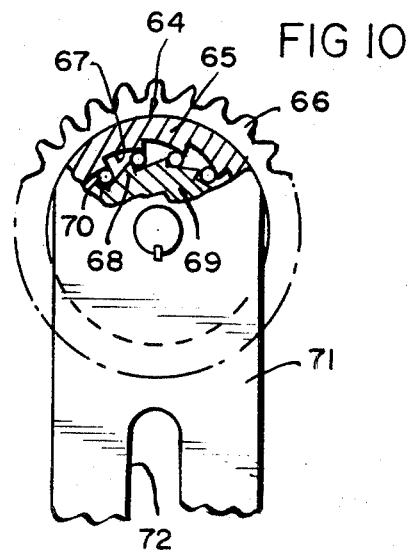
FIG. 10 is an enlarged fragmentary detail view partially in section illustrating an indexing ratchet for moving the conveyor and thus the meat through successive increments of movement.

Another very important feature of the invention is the indexing means for indexing the drive means embodied in the chain 15 in successive increments of movement. In the illustrated embodiment this indexing means comprises a reciprocable ratchet means 64 illustrated in enlarged detail in FIG. 10. The ratchet means illustrated is only one form of such means that could be used and comprises an outer circular housing 65 within and forming a part of a chain drive sprocket 66 with the interior of this hollow housing 65 being shaped to provide a series of inclined wedge surfaces 67 that are adapted to cooperate with a series of wedge surfaces 68 on an inner rotatable drive member 69.

Located within the space between the surfaces 67 and 68 are a series of balls 70. The inner drive member 69 is keyed to an indexing arm 71 for movement therewith. This arm 71 has an elongated longitudinal slot 72 therein. The arm or lever 71 is attached to one end of a drive rod 73 by means of an adjustable pin 74 passing through the slot 72. This drive rod 73 is reciprocable in a generally horizontal direction so that each movement of the lever 71 to the right from the position shown in FIG. 1 causes no movement of the sprocket 66 due to the fact that the drive member 69 when turned in this counterclockwise direction permits the housing 65 to remain stationery with the series of balls 70 merely rotating relative to the wedge surfaces 67 and 68. However, movement of the indexing lever 71 in the opposite direction or to the left causes the balls 70 to be wedged between the opposite surfaces 67 and 68 thereby turning the sprocket 66 one increment of a complete revolution in a clockwise direction as viewed in the drawings. The connecting pins 74 and slot 72 arrangement permits varying the length of this increment of movement. Thus with the parts in the position shown in the drawings the distance of indexing is at a minimum. With the connecting pin 74 moved up to the top of its slot 72 or adjacent the sprocket 66 the length of each increment of movement is at a maximum.

In order to reciprocate the drive rod 73 in the above described back and forth movement the other end of this rod is attached to the top end of an elongated indexing plate 75 by the fitting 76. The lower end of this plate 75 is attached to a cylindrical bearing 77 that is rotatable on a transverse shaft 78 extending between the sides 13.

Mounted on the drive shaft 44 for rotation therewith is a plate cam 79 that has a peripheral surface 80 against which bears a cam follower roller 81 that is rotatably mounted on the indexing plate 75. The peripheral cam surface 80 is of varying radius and includes a drop-off step 82 at one point. From the drop-off step 82 the cam surface 80 gradually increases in radius for a little over 180° to approximately the point 83 (FIG. 1) where the remainder 84 of the cam surface is of substantially constant radius to the drop-off step 82. The drive mechanism and the shaft 44 are rotated in a clockwise direction 85 as viewed in FIGS. 1, 2 and 3.

The top end of the indexing plate 75 is attached adjacent fitting 76 to a tension spring 86 whose forward end is attached to a mounting bracket 87. The spring 86 constantly urges the indexing plate 75 in a counterclockwise direction as viewed in FIGS. 1-3.

The drive means endless chain 15 passes over the indexing sprocket 66 and over an oppositely located sprocket 88 so that the upper reach 89 of the chain 15 is slidable on the top surface of the partition 11.

Figure 9:
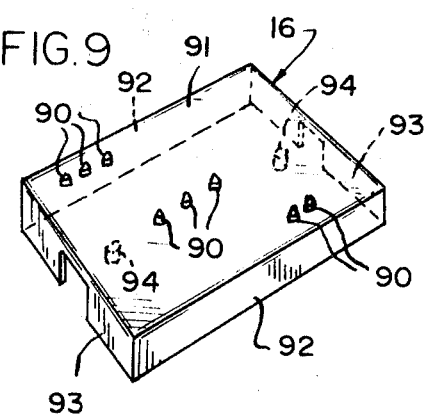
FIG. 9 is a perspective view illustrating a support or platform on which the meat is positioned during tenderizing.

During tenderizing the meat 17 is retained on the support platform 16 by being impaled on a plurality of meat penetrating pins 90 that extend upwardly from the meat supporting surface 91 of the platform 16. In the illustrated embodiment the impaling pins 90 are arranged in spaced groups that comprise spaced but parallel longitudinal rows of the pins as illustrated in FIG. 9.

The meat supporting platform 16 includes a downturned edge flange having sides 92 and ends 93 whose lower edges are coplanar to slide on the top surface of the partition 11. In order to releasably secure the platform 16 and the meat 17 thereon to the horizontal reach 89 of the chain the bottom of the platform within the confines of the flange 92-93 is provided with a pair of projecting members 94 each adjacent an end flange part 93 for engaging individual links 95 of the chain.

The operation of the tenderizing apparatus embodied in the drawings is as follows. The support platform 16 with a piece of meat 17 thereon is positioned on the top surface of the horizontal partition 11 in the position illustrated in FIG. 1 with the pair of end projecting members 94 engaging a pair of links 95 of the chain. In this position the forward end 96 of the meat is approximately beneath one set of tenderizing blades 19 and both sets of blades and the operating structure therefor are in their elevated positions. The electric motor 35 when energized rotates the shaft 44 and the crank arm 50 in the direction 85 with the result that the drive rods 52 and 53 drive the knives 19 from their elevated position shown in FIGS. 1 and 4.

Because the springs 61 hold the transverse top bars 59 against the tops of the bearing blocks 58 the holddown or stripper bars 56 are also lowered with the mounting plates 25 for the blades 19.

During the first rotational movement of the drive shaft 44 toward the position shown in FIG. 2 the stripper bars 56 first contact the top surface 24 of the meat because these bars 56 are at a lower elevation than the ends 30 of the blades 19. Continued rotation of the drive shaft 44 and the structure attached thereto to the position shown in FIG. 2 results in the blades 19 penetrating the meat to sever fibers illustrated at 23 herein.

Because of the described lost motion connection between the stripper bars 56 and the blades 19 the bars 56 remain spring urged in a downward position while the knives 19 continue to travel. As a result of this the bearing blocks 58 that are attached to the blade plates 25 continue to move and are drawn away from the stop bars 59 as illustrated by the left bearing blocks 58 in FIG. 2. Because in FIG. 2 the tenderizing action has just begun the forwardmost stripper bar 56 does not contact the top surface 24 but clears the forward end of the meat so that it is actually held in a lower position by its springs 61 than is the opposite bar 56. However, on the next knife penetrating movement when the meat has been indexed forwardly both stripper bars 56 will contact the top surface 24 of the meat.

During this rotation of the shaft 44 through the first 180° of a complete revolution or from the position of FIG. 1 to the position of FIG. 2 the indexing plate 75 is turned to the right about its bearing 77 because of the gradually increasing radius of the cam surface 80 to approximately the point 83 after which the surface 84 is of substantially constant radius. This movement of the plate 75 to the right moves the indexing lever 71 in a counterclockwise direction but without any corresponding movement of the drive sprocket 56 for the reasons already given. At the same time the tension spring 86 is stressed by the above described movement of the indexing plate 75.

On continued rotation of the shaft 44 from the 180° rotational position of FIG. 2 toward the starting position illustrated in FIG. 3 the blades 19 are first lifted from their meat penetrating position of FIG. 2 by the drive rods 52 and 53 lifting the mounting plates 25 and the blades 19 attached thereto. During this initial withdrawal of the blades there is no corresponding movement of the stripper bars 56 that are in engagement with the top surface 24 of the meat because of the lost motion connection. It is not until the blades have been completely withdrawn and the bearing blocks 58 have returned to their engagement with the lower surfaces of the transverse bars 59 as illustrated at 55 that continued rotation of the crank arms 50 lift the stripper bars 56 from the meat. As has been pointed out the forward stripper 56 shown in FIG. 4 does not contact the meat because the meat has not yet been indexed to contact this forward bar 56.

During this continued rotation of the drive shaft 44 toward the position of FIG. 3 as illustrated and described the cam follower roller 81 drops off the step 82 under the counterclockwise urging of the indexing plate 75 by the stressed tension spring 86. This urging of the spring 86 causes the drive rod 73 to move the indexing lever 71 in a clockwise direction so that the ratchet 64 now moves the chain 15 and the platform 16 one increment of movement to the right. Because of the relationship of the step portion 82 of the cam surface to the drive mechanism for the cutting blades 19 this indexing does not take place until the blades are in their elevated position. This is illustrated clearly in FIG. 3 where the cam follower is at the bottom of the step 82 and the blades are in their topmost position. In FIG. 1 the cam follower roller 81 is just beyond the step 82 and in engagement with the gradually increasing radius surface portion 80 of the cam. Thus in the position of FIG. 1 the tenderizing blades 19 are just beginning their downward movement on the next cycle of meat penetration and well before they reach the top surface 24 of the meat the meat 17 and its supporting platform 16 have been indexed to the next position for tenderizing.

The meat tenderizing apparatus of this invention has a number of very important advantages over those previously proposed as pointed out in the preceding descriptions. A very important advantage is the provision of the tenderizing blades in two sets that are downwardly converging as they penetrate the meat in severing the fibers and similar tough elements. As can be seen in FIG. 2, for example, the arranging of the two sets of blades in this manner permits a double penetrating and tenderizing action for each area of the meat as it is indexed along on its supporting platform. Thus the forward set of blades 19 or those to the right in FIG. 2 penetrate the meat and sever the fibers 23 at one angle and then the rearward set of blades 19 or those to the left in FIG. 2 have a chance to penetrate the meat and sever the fibers illustrated at 23 by penetrating at the opposite angle. Then, an additional effect is obtained by the converging nature of the two sets of blades in that the blades sliding into the meat simultaneously tend to squeeze the meat between them.

Although one embodiment of a drive structure for the movable parts of the apparatus has been shown this is by way of example only as the possible structures for achieving the drive of the knives, the hold-down means, the indexing mechanism and the like are practically limitless.

Having described my invention as related to the embodiment shown in the accompanying drawings it is my intention that the invention be not limited by any of the details of description, unless otherwise specified, but rather be construed broadly within its spirit and scope as set out in the appended claims.

I claim:

1. Apparatus for tenderizing meat, comprising: a support for the meat during tenderizing; a plurality of elongated cutting elements each comprising a blade with a cutting edge end; means for retaining said blades in two sets of a plurality of blades each with each set arranged at an acute angle to said support and thereby the meat held by the support and the two sets at an acute angle to each other; and means for reciprocating said sets of cutting elements at said acute angles into and from meat held by said support.

2. The apparatus of claim 1 wherein the blades in each said set are closely spaced, substantially parallel and in a substantially common plane.

3. The apparatus of claim 2 wherein each said blade comprises a slender shank and a chisel cutting edge that is concave between its opposite sides.

4. The apparatus of claim 1 wherein the means for retaining said blades in two sets comprises a pair of mounting means each extending transversely to said support and means for attaching each set of blades to a said mounting means, the means for retaining holding the two sets of blades at an acute angle converging toward said support.

5. Apparatus for tenderizing meat, comprising: a support for the meat during tenderizing; a plurality of elongated cutting elements each comprising a blade with a cutting edge end; means for retaining said blades in two sets of a plurality of blades each with each set arranged at an acute angle to said support and thereby the meat held by the support and the two sets at an acute angle to each other in which the means for retaining said blades in two sets comprises a pair of mounting means each extending transversely to said support and means for attaching each set of blades to a said mounting means, the means for retaining holding the two sets of blades at an acute angle converging toward said support, each said mounting means comprising a plate; attaching means for attaching each said set of blades adjacent to an edge of a plate and substantially coplanar with the plate; and means for reciprocating said sets of cutting elements at said acute angles into and from meat held by said support.

6. The apparatus of claim 5 wherein the blades in each said set are closely spaced, substantially parallel and in a substantially common plane that is substantially coplanar with a side surface of a said plate.

7. The apparatus of claim 5 wherein each said mounting means plate is provided with spaced slide blocks and there are provided a guide means for each block on which the block is slidable for confining said reciprocating of a said set of blades to a fixed angular path.

8. The apparatus of claim 7 wherein said guide means for each set of blades comprises parallel rods each engaging an opening in a said block on which said blocks are slidable during said reciprocating.

9. The apparatus of claim 5 wherein said support comprises a platform and said meat engaging means comprises a plurality of projecting pins on said platform embedded in said meat during said retaining, and there is provided a chain for moving said platform, said chain having a portion thereof engaging the platform arranged substantially horizontally and said platform also being arranged substantially horizontally.

10. The apparatus of claim 9 wherein said chain has a portion thereof engaged by the platform movable on a supporting surface, and said platform comprises a flat meat supporting surface portion and a downturned flange therearound within the confines of which are located said securing means, opposite sides of said platform flange having cutout portions for positioning the platform over the chain and in sliding engagement with said supporting surface, the securing means being aligned with each other and with said openings.

11. Apparatus for tenderizing meat, comprising: a support for the meat during tenderizing; a plurality of elongated cutting elements each comprising a blade with a cutting edge end; means for retaining said blades in two sets of a plurality of blades each with each set arranged at an acute angle to said support and thereby the meat held by the support and the two sets at an acute angle to each other; and means for reciprocating said sets of cutting elements at said acute angles into and from meat held by said support, the blades in each of said sets being closely spaced, substantially parallel and in a substantially common plane, the means for retaining said blades in two sets comprises a pair of mounting means each extending transversely to said support and means for attaching each set of blades to a said mounting means, the means for retaining holding the two sets of blades at an acute angle converging toward said support, said mounting means being provided with spaced slide blocks and a guide means for each block on which the blocks are slidable for confining said reciprocating of a said set to a fixed angular path, and said means for reciprocating said sets of cutting elements comprises a shaft, means for rotating said shaft, and cranks and drive rods operatively connecting said shaft to said sets of blades.

12. The apparatus of claim 11 wherein each said mounting means comprises a plate, attaching means are provided for attaching said blades in a set adjacent an edge of the plate and substantially coplanar with an adjacent side surface of the plate, and each said guide means for each set of blades comprise parallel rods each engaging an opening in a said guide block on which said blocks and thus said blade mounting means are slidable during said reciprocating.

13. Apparatus for tenderizing meat, comprising: a support for the meat during tenderizing; a plurality of cutting elements each comprising a blade with a cutting edge end; a mounting means to which said blades are attached; means for reciprocating said blades into and from meat held by said support; hold-down means for engaging and holding the meat on said support during said reciprocating; spring means for urging said hold-down means against the meat; means operatively interconnecting said hold-down means and blades on said reciprocating of the blades away from the meat for withdrawing the hold-down means from the meat against the urging of said spring means; and means for providing relative movement of the blades with respect to the hold-down means on said reciprocating of said blades into the meat for substantially unrestricted spring urging of said hold-down means into said engagement with the meat.

14. The apparatus of claim 13 wherein said interconnecting means comprise lost motion connections between said hold-down means and blade mounting means providing substantially complete withdrawal of said blades from the meat prior to said withdrawal of the hold-down means from the meat.

15. The apparatus of claim 14 wherein said lost motion connection comprises a bearing member on said blade mounting means, a guide member on said hold-down means movable within said bearing member, and stop means for limiting the movement of the hold-down means toward said support to a fully extended position.

16. Apparatus for tenderizing meat, comprising: a movable support for the meat during tenderizing; a plurality of elongated cutting elements each comprising a blade with a cutting edge end; means for reciprocating said blades toward and away from said support and thus into and out of meat thereon; drive means for moving said support and thereby meat thereon relative to said blades; indexing means for indexing said drive means in successive increments of movement comprising a reciprocable ratchet means operatively connected to said drive means for said indexing on movement of said reciprocable ratchet means in one direction; and means for varying the extent of said movement of said ratchet means to vary the extent of each said indexing movement comprising a lever attached to said ratchet means for movement therewith, a drive rod attached to said lever at an area thereon for moving the lever and thus said ratchet means, and means for varying the position of said area of attachment relative to said ratchet means for varying the magnitude of said indexing.

17. The apparatus of claim 16 wherein said means for varying comprises a lever attached to said ratchet means for movement therewith, a movable cam, and a cam follower in engagement therewith and operatively attached to said lever for operation of said ratchet means in one direction on movement of said cam.

18. The apparatus of claim 17 wherein said cam is rotatable about an axis, said cam follower is movable toward and away from said axis on rotation of said cam, and there is provided spring means for urging said cam follower toward said axis and said ratchet means in said one direction, movement of said reciprocable ratchet means in an opposite direction to said one direction thereby distorting said spring means so that movement of said cam follower toward said axis results in the stressed spring moving said ratchet means in said one direction.

* * * * *